(12) United States Patent
Lv et al.

(10) Patent No.: US 12,145,568 B2
(45) Date of Patent: Nov. 19, 2024

(54) CONTROL METHOD AND SYSTEM FOR HYBRID POWER SYSTEM

(71) Applicant: WEICHAI POWER CO., LTD., Shandong (CN)

(72) Inventors: Fenglong Lv, Weifang (CN); Lei Zhang, Weifang (CN); Yamei Xu, Weifang (CN); Fei Wang, Weifang (CN); Zhengxing Zhang, Weifang (CN); Bin Zhang, Weifang (CN)

(73) Assignee: WEICHAI POWER CO., LTD., Weifang (CN)

( * ) Notice: Subject to any disclaimer, the term of this patent is extended or adjusted under 35 U.S.C. 154(b) by 453 days.

(21) Appl. No.: 17/600,971

(22) PCT Filed: Apr. 12, 2019

(86) PCT No.: PCT/CN2019/082385
§ 371 (c)(1),
(2) Date: Oct. 1, 2021

(87) PCT Pub. No.: WO2020/206667
PCT Pub. Date: Oct. 15, 2020

(65) Prior Publication Data
US 2022/0176937 A1   Jun. 9, 2022

(51) Int. Cl.
*B60W 20/00* (2016.01)
*B60K 6/40* (2007.10)
*H02P 23/06* (2016.01)

(52) U.S. Cl.
CPC .............. *B60W 20/00* (2013.01); *B60K 6/40* (2013.01); *H02P 23/06* (2013.01);
(Continued)

(58) Field of Classification Search
CPC ......... B60W 20/00; B60W 2510/0638; B60W 2510/0657; B60W 2510/081;
(Continued)

(56) References Cited

U.S. PATENT DOCUMENTS 5,844,342 A    12/1998  Miyatani et al.
6,340,847 B1 *  1/2002  Kawabata ............... B60L 15/20
                                                          903/910
(Continued)

FOREIGN PATENT DOCUMENTS

CN    102700398 A    10/2012
CN    102710097 A    10/2012
(Continued)

OTHER PUBLICATIONS

Machine Translation of DE-102010016844-A1 (Year: 2011).*
(Continued)

*Primary Examiner* — Alan D Hutchinson
(74) *Attorney, Agent, or Firm* — Kilpatrick Townsend & Stockton LLP

(57) ABSTRACT

A control method is applied to a hybrid power system including an engine and a motor. A motor stator of the motor is connected to a driving shaft of a motor vehicle by means of a transmission mechanism such that, when rotated, the driving shaft drives the motor stator to rotate; the motor is used to determine output torque according to the rotating speed of the motor and transmit same to the driving shaft; the rotating speed of the motor is equal to the difference between the rotating speed of the motor rotor and the rotating speed of the motor stator. The method includes, according to operating parameters of the hybrid power system and operating parameters of the motor vehicle,
(Continued)

controlling a motor controller to provide a drive signal to the motor stator such that the operating parameters of the motor meet a first preset formula.

10 Claims, 9 Drawing Sheets

(52) U.S. Cl.
CPC ............... *B60W 2510/0638* (2013.01); *B60W 2510/0657* (2013.01); *B60W 2510/081* (2013.01); *B60W 2510/083* (2013.01); *B60W 2510/104* (2013.01); *B60W 2520/105* (2013.01); *B60W 2530/16* (2013.01); *B60W 2710/081* (2013.01); *B60W 2710/083* (2013.01); *B60Y 2200/92* (2013.01); *B60Y 2400/60* (2013.01)

(58) Field of Classification Search
CPC ..... B60W 2510/083; B60W 2510/104; B60W 2520/105; B60W 2530/16; B60W 2710/081; B60W 2710/083; B60W 20/40; B60W 30/18054; B60W 30/18127; B60W 2710/0644; B60W 2710/0666; B60W 2710/1038; B60W 10/08; B60W 10/06; B60W 20/10; B60K 6/40; B60K 2006/262; B60K 6/387; B60K 6/442; B60K 6/445; B60K 2006/4825; B60K 6/26; B60K 6/46; H02P 23/06; B60Y 2200/92; B60Y 2400/60; B60Y 2400/608; Y02T 10/62

See application file for complete search history.

(56) References Cited

U.S. PATENT DOCUMENTS

| | | | |
|---|---|---|---|
| 7,863,847 | B2 | 1/2011 | Morita et al. |
| 2009/0033250 | A1 | 2/2009 | Morita et al. |
| 2013/0110333 | A1 | 5/2013 | Song et al. |

FOREIGN PATENT DOCUMENTS

| | | | | |
|---|---|---|---|---|
| CN | 103085648 | A | | 5/2013 |
| CN | 103213489 | A | | 7/2013 |
| CN | 105730438 | A | | 7/2016 |
| DE | 10015912 | A1 | | 10/2001 |
| DE | 102010016844 | A1 | * | 11/2011 ............ B60K 17/02 |
| EP | 1026023 | A2 | | 8/2000 |
| JP | 2009-033939 | A | | 2/2009 |
| JP | 2009-274537 | A | | 11/2009 |
| JP | 2009-278746 | A | | 11/2009 |
| JP | 2010116101 | A | | 5/2010 |
| JP | 2010-208486 | A | | 9/2010 |
| JP | 2011-079408 | A | | 4/2011 |
| JP | 2011-199974 | A | | 10/2011 |
| JP | 5171783 | B2 | | 3/2013 |
| WO | WO 2005/030517 | A1 | | 4/2005 |

OTHER PUBLICATIONS

PCT International Search Report and Written Opinion, PCT/CN2019/082385, Jan. 16, 2020, 12 pgs.
European Patent Office, Extended European Search Report and Opinion, EP Patent Application No. 19923994.8, Sep. 28, 2022, nine pages.
Japan Patent Office, Office Action, JP Patent Application No. 2021-559540, Oct. 4, 2022, ten pages.

* cited by examiner

--Prior Art--

--Prior Art--

--Prior Art--

--Prior Art--

CONTROL METHOD AND SYSTEM FOR HYBRID POWER SYSTEM

The present application is a 35 U.S.C 371 Patent Application of PCT Application No. PCT/CN2019/082385, filed on Apr. 12, 2019, which is incorporated herein by reference in its entirety.

FIELD

The present application relates to the technical field of vehicle engineering, and in particular to a method for controlling a hybrid power system and a system thereof.

BACKGROUND

With the continuous development of vehicle engineering technology, a driving method of a motor vehicle has developed from a traditional pure internal combustion engine driving to a hybrid driving and a pure electric driving. Gasoline-electric hybrid driving has become the mainstream new energy vehicle driving method since the gasoline-electric hybrid driving method has a relatively mature power system.

In a gasoline-electric hybrid vehicle, a hybrid power system is the main factor that determines key parameters such as operation smoothness and efficiency of energy utilization.

A hybrid power system in the conventional art mainly includes a series system solution, a parallel system solution, a series-parallel system solution, and a series-parallel system solution including structure such as a planetary row. In these hybrid power systems, a motor needs to start operation from zero speed under some working conditions such as engine start. In a case that the motor is operating at zero speed or in a low speed range, performances such as efficiency and torque response thereof are poor, which causes the user to have a poor experience.

SUMMARY

In order to solve the above technical issues, a method for controlling a hybrid power system and a system thereof are provided according to the present application, which avoids the occurrence of the motor running in the zero speed or low speed range, thereby avoiding the occurrence of issues such as low efficiency and poor torque response of the motor in these operating states and improving the user's experience.

In order to achieve the above objects, the following technical solutions are provided according to the embodiments of the present application.

A method for controlling a hybrid power system is applied to the hybrid power system including an engine and a motor; the motor includes a motor rotor, a motor stator, and a motor controller; an output shaft of the engine is connected to a center shaft of the motor rotor, two ends of the center shaft of the motor rotor are respectively connected to two motor bearings, and the motor rotor is supported by the two motor bearings; the motor controller is connected to the motor stator to provide a driving current for the motor stator; the motor stator is connected to a driving shaft of a motor vehicle through a transmission mechanism, so that the motor stator is driven to rotate when the driving shaft rotates; the motor is configured to determine an output torque according to a rotation speed of the motor, and transmit the output torque to the driving shaft; the rotation speed of the motor is equal to a difference between a rotation speed of the motor rotor and a rotation speed of the motor stator; the method for controlling the hybrid power system includes:

obtaining operating parameters of the hybrid power system, where the operating parameters of the hybrid power system includes a rotation speed of the engine, the rotation speed of the motor, a net output torque of the engine and a torque of the motor; the speed of the motor is equal to the difference between the rotation speed of the motor rotor and the rotation speed of the motor stator;

obtaining operating parameters of the motor vehicle, where the operating parameters of the motor vehicle includes a rotation speed of the driving shaft, a resistance torque of the motor vehicle, and an acceleration torque of the motor vehicle;

controlling the motor controller to provide a driving signal for the motor stator according to the operating parameters of the hybrid power system and the operating parameters of the motor vehicle, so that operating parameters of the motor satisfy a first preset formula;

where the first preset formula is $$\begin{cases} n_{Veh} = n_{Eng} - n_{TM} \\ T_{Veh} + T_a = T_{Eng} = T_{TM} \end{cases};$$

$n_{Veh}$ is the rotation speed of the driving shaft; $n_{Eng}$ is the rotation speed of the engine; $n_{TM}$ is the rotation speed of the motor; $T_{Veh}$ is the resistance torque of the motor vehicle; $T_a$ is the acceleration torque of the motor vehicle; $T_{Eng}$ is the net output torque of the engine; $T_{TM}$ is the torque of the motor.

In an embodiment, in a case that the motor vehicle is in a parking state;

that, controlling, according to the operating parameters of the hybrid power system and the operating parameters of the motor vehicle, the motor controller to provide the driving signal for the motor stator, so that operating parameters of the motor satisfy the first preset formula, includes:

in a case that the engine is stopped, controlling the rotation speed of the motor to be 0 rpm;

in a case that the engine is idling, controlling the rotation speed of the motor to be equal to the rotation speed of the engine, and controlling the torque of the motor to be equal to the net output torque of the engine;

in a case that the engine is in a parking and electricity generation state, controlling the rotation speed of the motor to be equal to the rotation speed of the engine, and controlling the torque of the motor to be equal to the net output torque of the engine; a torque of the motor stator of the motor is provided by a braking system of the motor vehicle.

In an embodiment, in a case that the motor vehicle is in an engine start process or a travelling process;

that, controlling, according to the operating parameters of the hybrid power system and the operating parameters of the motor vehicle, the motor controller to provide the driving signal for the motor stator, so that operating parameters of the motor satisfy the first preset formula, includes:

in a case that the motor vehicle is in the engine start or the travelling process, controlling the rotation speed of the motor to be equal to a difference between the rotation speed of the engine and the rotation speed of the driving shaft;

in a case that the motor vehicle is in a travelling and electricity generation process, controlling the motor to use redundant power of the engine for electricity generation in travelling;

where the redundant power of the engine is equal to a difference between a total output power of the engine and a driving power of the engine.

In an embodiment, that, controlling the rotation speed of the motor to be equal to the difference between the rotation speed of the engine and the rotation speed of the driving shaft, includes:

in a premise that the rotation speed of the motor is controlled to be equal to the difference between the rotation speed of the engine and the rotation speed of the driving shaft, adjusting the rotation speed of the motor and the rotation speed of the engine, so that the motor runs in a preset working range, where efficiency of the preset working range is higher than or equal to a preset value.

In an embodiment, in a case that the motor vehicle is in a braking process;

that, controlling, according to the operating parameters of the hybrid power system and the operating parameters of the motor vehicle, the motor controller to provide the driving signal for the motor stator, so that operating parameters of the motor satisfy the first preset formula, includes:

controlling a difference between the rotation speed of the engine and the rotation speed of the motor to be equal to the rotation speed of the driving shaft.

A system for controlling a hybrid power system is applied to the hybrid power system including an engine and a motor; the motor includes a motor rotor, a motor stator, and a motor controller; an output shaft of the engine is connected to a center shaft of the motor rotor, two ends of the center shaft of the motor rotor are respectively connected to two motor bearings, and the motor rotor is supported by the two motor bearings; the motor controller is connected to the motor stator to provide a driving current for the motor stator; the motor stator is connected to a driving shaft of a motor vehicle through a transmission mechanism, so that the motor stator is driven to rotate when the driving shaft rotates; the motor is configured to determine an output torque according to a rotation speed of the motor, and transmit the output torque to the driving shaft; the rotation speed of the motor is equal to a difference between a rotation speed of the motor rotor and a rotation speed of the motor stator; the system for controlling the hybrid power system includes:

a first parameter obtaining module configured to obtain operating parameters of the hybrid power system, where the operating parameters of the hybrid power system includes a rotation speed of the engine, the rotation speed of the motor, a net output torque of the engine and a torque of the motor; the rotation speed of the motor is equal to the difference between the rotation speed of the motor rotor and the rotation speed of the motor stator;

a second parameter obtaining module configured to obtain operating parameters of the motor vehicle, where the operating parameters of the motor vehicle includes a rotation speed of the driving shaft, a resistance torque of the motor vehicle, and an acceleration torque of the motor vehicle;

a motor control module configured to control, according to the operating parameters of the hybrid power system and the operating parameters of the motor vehicle, the motor controller to provide a driving signal for the motor stator, so that operating parameters of the motor satisfy a first preset formula;

where the first preset formula is $$\begin{cases} n_{Veh} = n_{Eng} - n_{TM} \\ T_{Veh} + T_a = T_{Eng} = T_{TM} \end{cases};$$

$n_{Veh}$ is the rotation speed of the driving shaft; $n_{Eng}$ is the rotation speed of the engine; $n_{TM}$ is the rotation speed of the motor; $T_{Veh}$ is the resistance torque of the motor vehicle; $T_\alpha$ is the acceleration torque of the motor vehicle; $T_{Eng}$ is the net output torque of the engine; $T_{TM}$ is the torque of the motor.

In an embodiment, in a case that the motor vehicle is in a parked state;

the motor control module is configured to control, according to the operating parameters of the hybrid power system and the operating parameters of the motor vehicle, the motor controller to provide a driving signal for the motor stator, so that operating parameters of the motor satisfy the first preset formula, where the motor control module is specifically configured to:

in a case that the engine is stopped, control the rotation speed of the motor to be 0 rpm;

in a case that the engine is idling, control the rotation speed of the motor to be equal to the rotation speed of the engine, and control the torque of the motor to be equal to the net output torque of the engine;

in a case that the engine is in a parked and electricity generation state, control the rotation speed of the motor to be equal to the rotation speed of the engine, and control the torque of the motor to be equal to the net output torque of the engine; a torque of the motor stator of the motor is provided by a braking system of the motor vehicle.

In an embodiment, in a case that the motor vehicle is in an engine start process or a travelling process;

that, the motor control module is configured to control, according to the operating parameters of the hybrid power system and the operating parameters of the motor vehicle, the motor controller to provide a driving signal for the motor stator, so that operating parameters of the motor satisfy the first preset formula, where the motor control module, is specifically configured to:

in a case that the motor vehicle is in the engine start or the travelling process, control the rotation speed of the motor to be equal to a difference between the rotation speed of the engine and the rotation speed of the driving shaft;

in a case that the motor vehicle is in a travelling and electricity generation process, control the motor to use redundant power of the engine for electricity generation in travelling;

where the redundant power of the engine is equal to a difference between a total output power of the engine and a driving power of the engine.

In an embodiment, that, the motor control module is configured to control the speed of the motor to be equal to the difference between the speed of the engine and the speed of the driving shaft, is specifically configured to:

in a premise that the rotation speed of the motor is controlled to be equal to the difference between the rotation speed of the engine and the rotation speed of the driving shaft, adjust the rotation speed of the motor and the speed of the engine, so that the motor runs in a preset working range, where efficiency of the preset working range is higher than or equal to a preset value.

In an embodiment, in a case that the motor vehicle is in a braking process;

that, the motor control module is configured to control, according to the operating parameters of the hybrid power system and the operating parameters of the motor vehicle, the motor controller to provide the driving signal for the motor stator, so that operating parameters of the motor satisfy the first preset formula, is specifically configured to:

control a difference between the rotation speed of the engine and the rotation speed of the motor to be equal to the rotation speed of the driving shaft.

It can be seen from the above technical solutions that a method and a system for controlling the hybrid power system are provided according to embodiments of the present application, where the method for controlling the hybrid power system is applied to the hybrid power system including an engine and a motor. The motor stator of the motor is connected to the driving shaft of the motor vehicle through the transmission mechanism to meet the operation requirements of the hybrid power system under various working conditions, which greatly reduces the number of parts and components of the hybrid power system, and reduces the structural complexity of the hybrid power system. In addition, the method for controlling the hybrid power system controls, according to the operating parameters of the hybrid power system and the operating parameters of the motor vehicle, the motor controller to provide the driving signal for the motor stator, so that operating parameters of the motor satisfy the first preset formula, thereby avoiding the possibility of the motor running at zero speed or in a low speed range under various working conditions, avoiding the occurrence of poor performance such as low efficiency and poor torque response of the motor in these operating conditions, and improving the user experience.

BRIEF DESCRIPTION OF THE DRAWINGS

For more clearly illustrating embodiments of the present application or the technical solutions in the conventional technology, drawings referred to for describing the embodiments or the conventional technology will be briefly described hereinafter. Apparently, drawings in the following description are only examples of the present application, and for the person skilled in the art, other drawings may be obtained based on the provided drawings without any creative efforts.

DETAILED DESCRIPTION OF THE EMBODIMENTS

As mentioned in the background technology, in a hybrid power system in the conventional art, a motor needs to start running from zero speed under some working conditions such as engine start. In a case that the motor is running at zero speed or in a low speed range, performances such as efficiency and torque response of the motor are poor, which causes the user to have a poor experience.

Figure 1:
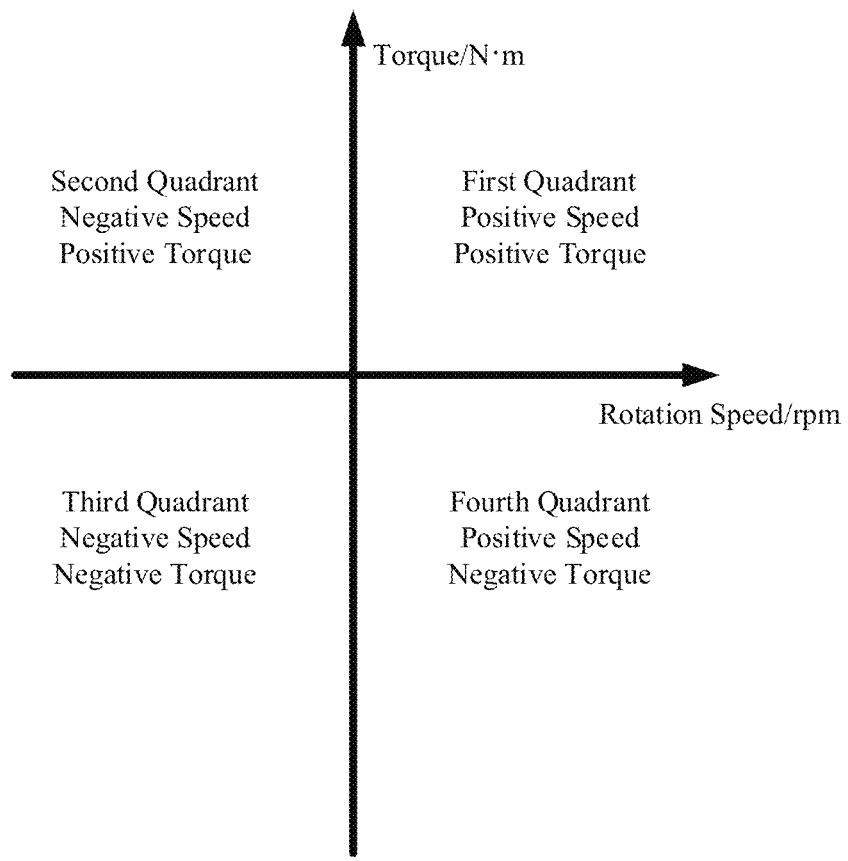
FIG. 1 is a schematic view of a definition of a speed direction and a torque direction of a motor.

Hybrid power systems in the conventional art are briefly introduced hereinafter. In order to facilitate the description of a speed direction and a torque direction of the engine and the motor of these hybrid power systems under various working conditions, in the present application, the speed direction and the torque direction of the motor of the hybrid power system are defined. Referring to FIG. 1, in FIG. 1, a horizontal axis represents the rotation speed of the motor in revolutions per minute (rpm); a vertical axis represents the torque output by the motor in newton meter (N·m). In a coordinate system in FIG. 1, values in the first quadrant indicates that the rotation speed of the motor is positive and the torque of the motor is positive; values in the second quadrant indicates that the rotation speed of the motor is negative; the torque of the motor is positive; values in the third quadrant indicates that the rotation speed of the motor and the torque of the motor are both negative; values in the fourth quadrant indicates that the rotation speed of the motor is positive and the torque of the motor is negative. It should also be noted that the rotation speed of the motor takes a forward direction of the vehicle as a positive value; a positive torque of the motor indicates that the torque direction is the same as the forward direction of the vehicle; a negative torque of the motor indicates that the torque direction is opposite to the forward direction of the vehicle.

Figure 2:
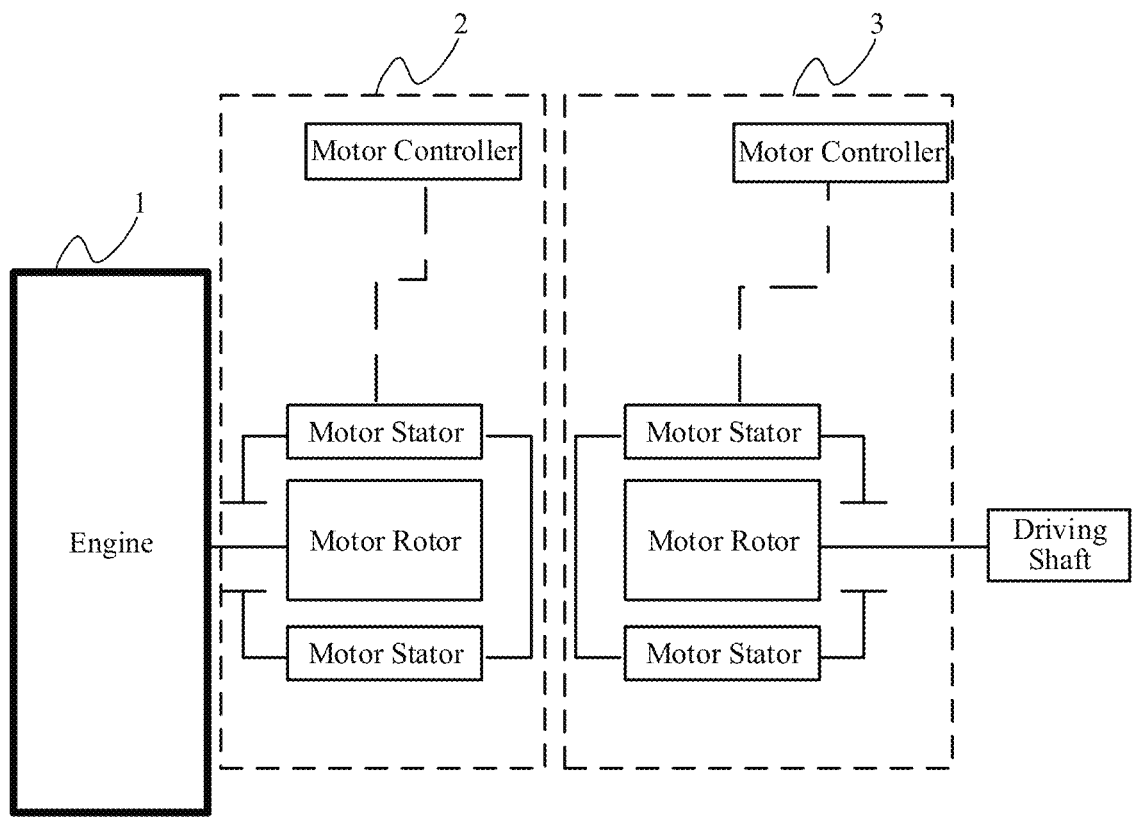
FIG. 2 to FIG. 5 are schematic structural views of structure of a hybrid power system in the conventional art.

Referring to FIG. 2, which is a series system solution of the hybrid power system in the conventional art. The solution mainly includes an engine 1, a generator 2, a driving motor 3, and etc. The generator 2 is directly connected to an output shaft of the engine 1. The engine 1 is not responsible for directly driving a motor vehicle, but only to provide the power required by the generator 1. The generator 1 is configured to start the engine 1 and generate electricity; the driving motor 3 is configured to drive the motor vehicle to travel (driving energy comes from an on-board power battery or electricity generated by the generator) and to be responsible for a kinetic energy recovery process of the motor vehicle.

During a start process of the engine 1, the generator 2 drives the engine 1 to start; when the vehicle is parked, the generator 2 and the engine 1 rotate at the same speed, and the rotation speed of the driving motor 3 is 0 rpm; during an engine start process or a travelling process of the vehicle, the rotation speed of the driving motor 3 starts to increase from 0 rpm, and the rotation speed of the motor is proportional to the speed of the vehicle; during a braking process of the vehicle, it is common that the engine 1 is stopped, so the rotation speed of the generator is 0 rpm, and the rotation speed of the driving motor is gradually decreased to 0 rpm; when the vehicle is reversing, the driving motor rotates reversely.

In this solution, the hybrid power system includes the engine 1, the generator 2, and the driving motor 3. The assembly is relatively long in size and relatively high in cost. The rotation speed and torque of the generator 2 during the operation process involve the first quadrant (only during the start process of the engine 1) and the fourth quadrant; the rotation speed and torque of the driving motor 3 during operation process involve the first, the third and the fourth quadrants.

Figure 3:
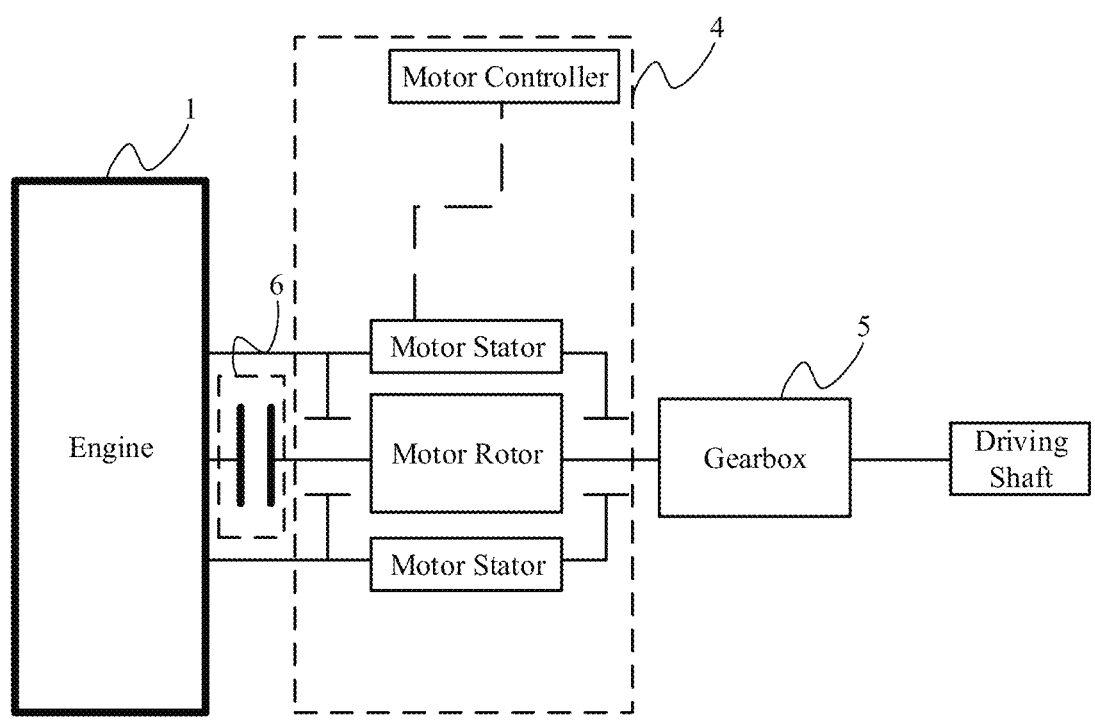

Referring to FIG. 3, it is a parallel system solution of the hybrid power system in the conventional art. The solution mainly includes an engine 1, a clutch 6, a motor 4, a gearbox 5, and etc. The engine 1 is connected to/disconnected from the motor 4 through the clutch 6, and the motor 4 is connected to a driving shaft of the vehicle through the gearbox 5. The engine 1 is configured to perform direct driving, joint driving and parking for electricity generation of the vehicle; the clutch 6 is configured to control engagement or disengagement of the engine 1 and the motor 4; the motor 4 is configured to perform direct driving, joint driving, braking energy recovery and parking for electricity generation of the vehicle; the gearbox 5 is configured to shift gears to match a rotation speed of the motor 4, a rotation speed of the engine 1 and a speed of the vehicle.

During a start process of the engine 1, the gearbox is in a neutral position, the clutch is engaged, and the motor drives the engine 1 to start; when the vehicle is parked, the clutch is disengaged, the rotation speed of the motor is 0 rpm, and the gearbox is in low speed gear positions or the neutral position; during an engine start process or a travelling process of the vehicle, the gearbox is in low speed gear positions, the rotation speed of the motor starts to increase from 0 rpm (the clutch is disengaged), gear position of the gearbox is shifted according to a strategy, and the engine 1 is involved in driving (the clutch is engaged); during a braking process of the vehicle, the clutch is disengaged, torque of the motor is negative and the rotation speed of the motor gradually decrease to zero; when the vehicle is reversing, the clutch is disengaged, the gearbox is in low speed gear positions, the motor rotates reversely (or the gearbox is in a reverse gear position, the motor rotates forwardly).

In this solution, the hybrid power system includes the engine, the clutch, the motor and the gearbox. The assembly has many pieces and is relatively long in size. The operation process involves gear position shifting of the gearbox, which may easily cause abrupt shifting and reduce the comfort performance. The control strategy is complicated, and the overall cost is relatively high. The rotation speed and the torque of the motor during the operation process involve the first quadrant, the third quadrant (which is not involved in a case that the gearbox is provided with a reverse gear) and the fourth quadrant.

Figure 4:
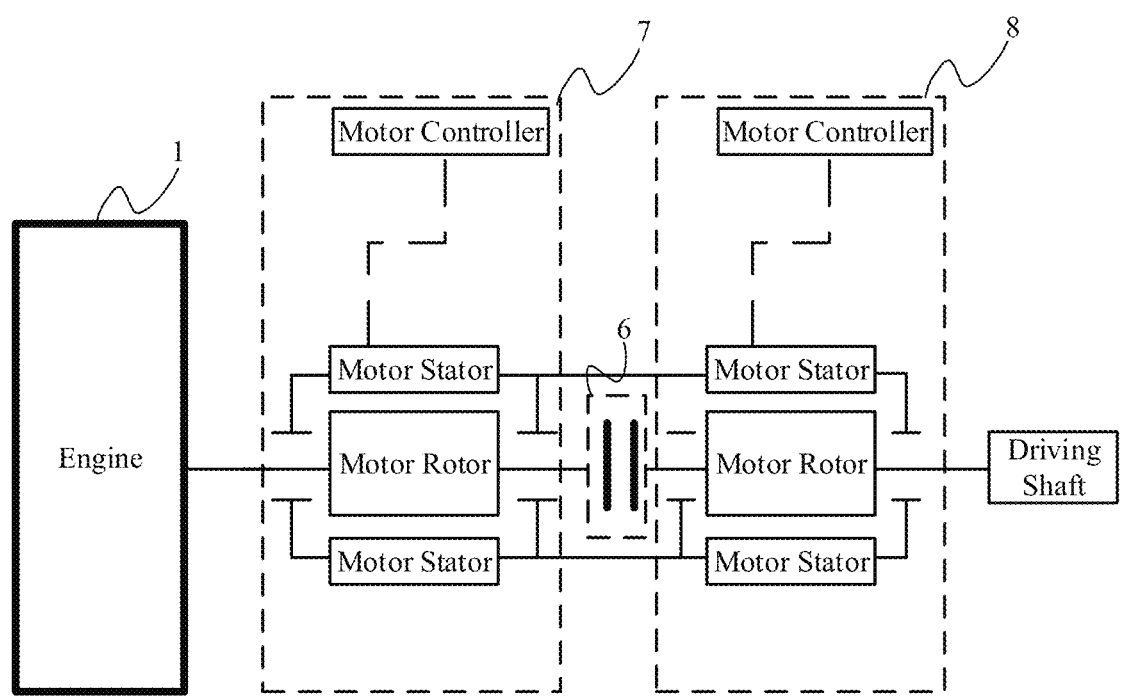

Referring to FIG. 4, it is a hybrid system solution in the conventional art. The solution mainly includes an engine 1, a generator 7, a clutch 6, a driving motor 8, and etc. The generator 7 is directly connected to the engine 1. The engine 1 is configured to perform direct driving, joint driving and parking for electricity generation of the vehicle; the generator 7 is configured to start engine 1 and perform electricity generation and driving. The clutch 6 is configured to control engagement or disengagement of the generator and driving motor; the driving motor 8 is configured to directly drive the vehicle to travel, and to be responsible for kinetic energy recovery of the vehicle.

During a start process of the engine 1, the generator drives the engine 1 to start; when the vehicle is parked, the clutch is disengaged, the generator and the engine 1 rotate at the same speed, and the driving motor rotates at 0 rpm; during an engine start process or a travelling process of the vehicle, the clutch is disengaged, the rotation speed of the motor starts to increase from 0 rpm, the rotation speed of the motor is proportional to the speed of the vehicle; the engine 1 and the generator are involved in driving (the clutch is engaged) according to a strategy; during a braking process of the vehicle, the clutch is disengaged, it is common that the engine 1 is stopped, so the rotation speed of the generator is 0 rpm, and the rotation speed of the driving motor is gradually decreased to 0 rpm; when the vehicle is reversing, the clutch is disengaged, and the driving motor rotates reversely.

In addition, there are hybrid systems including a planetary row and other structures.

The hybrid power system in FIG. 4 includes the engine 1, the clutch and two sets of motors. The assembly has many pieces, which causes the assembly to be relatively long in size, complicated in control and relatively high in overall cost. The rotation speed and torque of the first motor during operation involve the first quadrant (only used in the process of starting engine 1) and the fourth quadrant; the rotation speed and torque of the second motor during operation involve the first, the third and the fourth quadrants.

Figure 5:
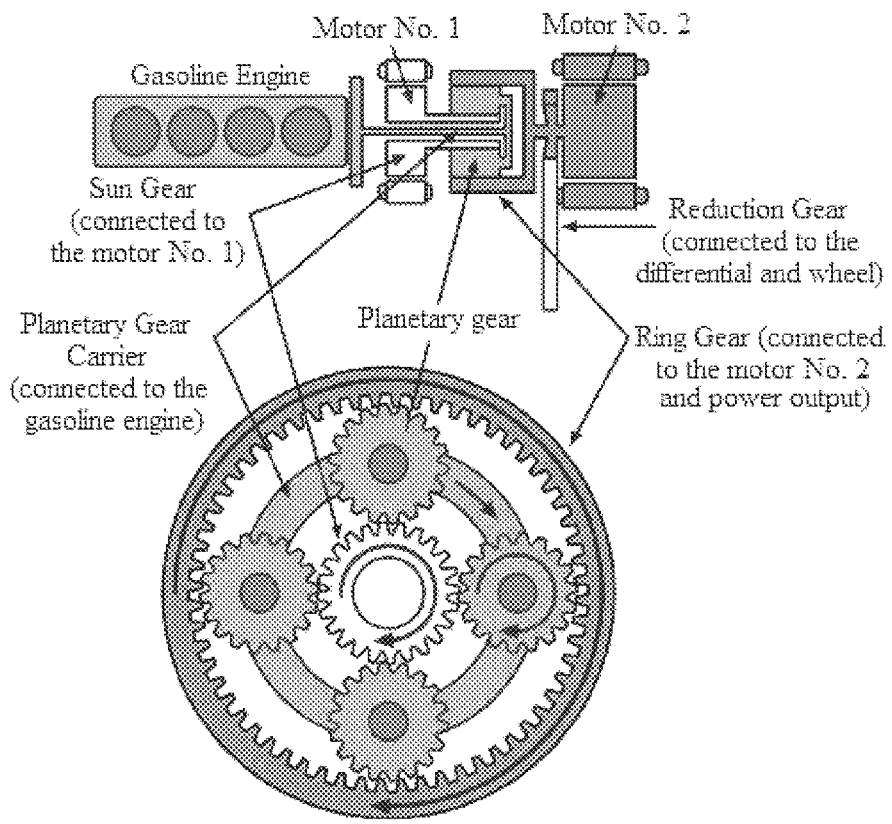

In addition, reference is made to FIG. 5, which shows a hybrid system including a planetary gear carrier and other structures in the conventional art. The hybrid system includes a gasoline engine, a motor No. 1, a motor No. 2, a sun gear, a reduction gear, planetary gears, a planetary gear carrier, a ring gear, and etc. A control process of the hybrid system shown in FIG. 5 is similar to the system shown in FIG. 4.

From FIG. 2 to FIG. 5, it can be found that the structure of the hybrid power system in the conventional art is relatively complicated, and in the actual application process, the motor may run at zero speed or in a low-speed range under certain working conditions, and performance such as efficiency and torque response of the motor are poor in these ranges.

In view of this, a method for controlling the hybrid power system is provided according to embodiments of the present application, which is applied to the hybrid power system including an engine and a motor. A motor controller is connected to a motor stator; the motor stator is further connected to a driving shaft of a motor vehicle. The method for controlling the hybrid power system includes: obtaining operating parameters of the hybrid power system, where the operating parameters of the hybrid power system includes the rotation speed of the engine, the rotation speed of the motor, the net output torque of the engine and the torque of the motor; the rotation speed of the motor is equal to the difference between the rotation speed of the motor rotor and the rotation speed of the motor stator; obtaining operating parameters of the motor vehicle, where the operating parameters of the motor vehicle includes the rotation speed of the driving shaft, the resistance torque of the motor vehicle, and the acceleration torque of the motor vehicle; controlling, according to the operating parameters of the hybrid power system and the operating parameters of the motor vehicle, the motor controller to provide a driving signal for the motor stator, so that operating parameters of the motor satisfy a first preset formula;

where the first preset formula is $$\begin{cases} n_{Veh} = n_{Eng} - n_{TM} \\ T_{Veh} + T_a = T_{Eng} = T_{TM} \end{cases};$$

$n_{Veh}$ is the rotation speed of the driving shaft; $n_{Eng}$ is the rotation speed of the engine; $n_{TM}$ is the rotation speed of the motor; $T_{Veh}$ is the resistance torque of the motor vehicle; $T_\alpha$ is the acceleration torque of the motor vehicle; $T_{Eng}$ is the net output torque of the engine; $T_{TM}$ is the torque of the motor.

The method for controlling the hybrid power system is applied to the hybrid power system including the engine and the motor. The motor stator of the motor is connected to the driving shaft of the motor vehicle through the transmission mechanism to meet the operation requirements of the hybrid power system under various working conditions, which greatly reduces the number of parts and components of the hybrid power system, and reduces the structural complexity of the hybrid power system. In addition, the method for controlling the hybrid power system controls, according to the operating parameters of the hybrid power system and the operating parameters of the motor vehicle, the motor controller to provide the driving signal for the motor stator, so that operating parameters of the motor satisfy the first preset formula, thereby avoiding the possibility of the motor running at zero speed or in a low speed range under various working conditions, avoiding the occurrence of poor performance such as low efficiency and poor torque response of the motor in these operating conditions, and improving the user experience.

The technical solutions according to the embodiments of the present application will be described clearly and completely as follows in conjunction with the drawings in the embodiments of the present application. It is apparent that the described embodiments are only a part of the embodiments according to the present application, rather than all of the embodiments. Based on the embodiments of the present application, all other embodiments obtained without creative efforts by those of ordinary skill in the art shall fall within the protection scope of the present application.

The method for controlling the hybrid power system is provided according to the embodiments of the present application, which is applied to the hybrid power system including an engine and a motor. The motor controller is connected to the motor stator; the motor stator is further connected to a driving shaft of a motor vehicle. The method for controlling the hybrid power system includes: S101: obtaining operating parameters of the hybrid power system, where the operating parameters of the hybrid power system includes a rotation speed of the engine, a rotation speed of the motor, a net output torque of the engine and a torque of the motor; the rotation speed of the motor is equal to the difference between the rotation speed of the motor rotor and the rotation speed of the motor stator; S102: obtaining operating parameters of the motor vehicle, where the operating parameters of the motor vehicle includes the rotation speed of the driving shaft, the resistance torque of the motor vehicle, and the acceleration torque of the motor vehicle; S103: controlling, according to the operating parameters of the hybrid power system and the operating parameters of the motor vehicle, the motor controller to provide a driving signal for the motor stator, so that operating parameters of the motor satisfy a first preset formula;

where the first preset formula is $$\begin{cases} n_{Veh} = n_{Eng} - n_{TM} \\ T_{Veh} + T_a = T_{Eng} = T_{TM} \end{cases};$$

$n_{Veh}$ is the rotation speed of the driving shaft; $n_{Eng}$ is the rotation speed of the engine; $n_{TM}$ is the rotation speed of the motor; $T_{Veh}$ is the resistance torque of the motor vehicle; $T_\alpha$ is the acceleration torque of the motor vehicle; $T_{Eng}$ is the net output torque of the engine; $T_{TM}$ is the torque of the motor.

In an embodiment, in a case that the motor vehicle is in a parking state, controlling, according to the operating parameters of the hybrid power system and the operating parameters of the motor vehicle, the motor controller to provide the driving signal for the motor stator, so that operating parameters of the motor satisfy the first preset formula, includes: in a case that the engine is stopped, controlling the rotation speed of the motor to be 0 rpm; in a case that the engine is idling, controlling the rotation speed of the motor to be equal to the rotation speed of the engine, and controlling the torque of the motor to be equal to the net output torque of the engine; in a case that the engine is in a parking and electricity generation state, controlling the rotation speed of the motor to be equal to the rotation speed of the engine, and controlling the torque of the motor to be equal to the net output torque of the engine; where the torque of the motor stator of the motor is provided by a braking system of the motor vehicle.

In an embodiment, in a case that the motor vehicle is in an engine start process or a travelling process; that, controlling, according to the operating parameters of the hybrid power system and the operating parameters of the motor vehicle, the motor controller to provide the driving signal for the motor stator, so that operating parameters of the motor satisfy the first preset formula, includes: in a case that the motor vehicle is in the engine start or the travelling process, controlling the rotation speed of the motor to be equal to a difference between the rotation speed of the engine and the rotation speed of the driving shaft; in a case that the motor vehicle is in a travelling and power generation process, controlling the motor to use redundant power of the engine for electricity generation in travelling; where the redundant power of the engine is equal to a difference between a total output power of the engine and a driving power of the engine.

In an embodiment, that, controlling the rotation speed of the motor to be equal to the difference between the rotation speed of the engine and the rotation speed of the driving shaft, includes: in a premise that the rotation speed of the motor is controlled to be equal to the difference between the rotation speed of the engine and the rotation speed of the driving shaft, adjusting the rotation speed of the motor and rotation the speed of the engine, so that the motor runs in a preset working range, where efficiency of the preset working range is greater than or equal to a preset value.

In an embodiment, in a case that the motor vehicle is in a braking process; that, controlling, according to the operating parameters of the hybrid power system and the operating parameters of the motor vehicle, the motor controller to provide the driving signal for the motor stator, so that operating parameters of the motor satisfy the first preset formula, includes: controlling a difference between the rotation speed of the engine and the rotation speed of the motor to be equal to the rotation speed of the driving shaft.

Figure 7:
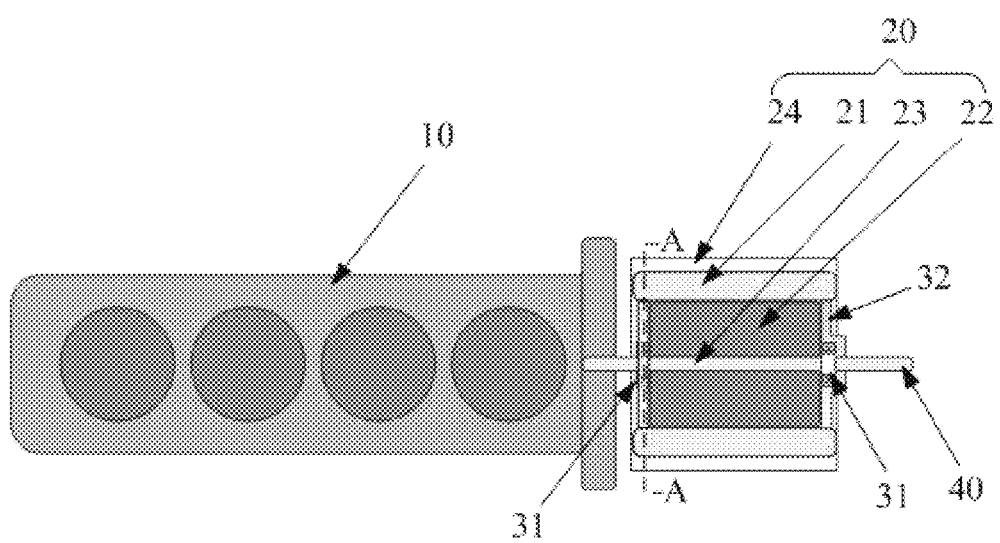
FIG. 7 is a schematic structural view of a hybrid power system provided according to an embodiment of the present application.
Figure 8:
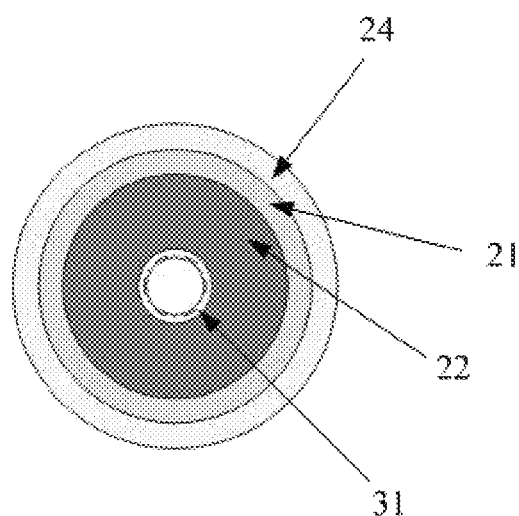
FIG. 8 is a schematic cross-sectional view of FIG. 7 along a line AA.
Figure 9:
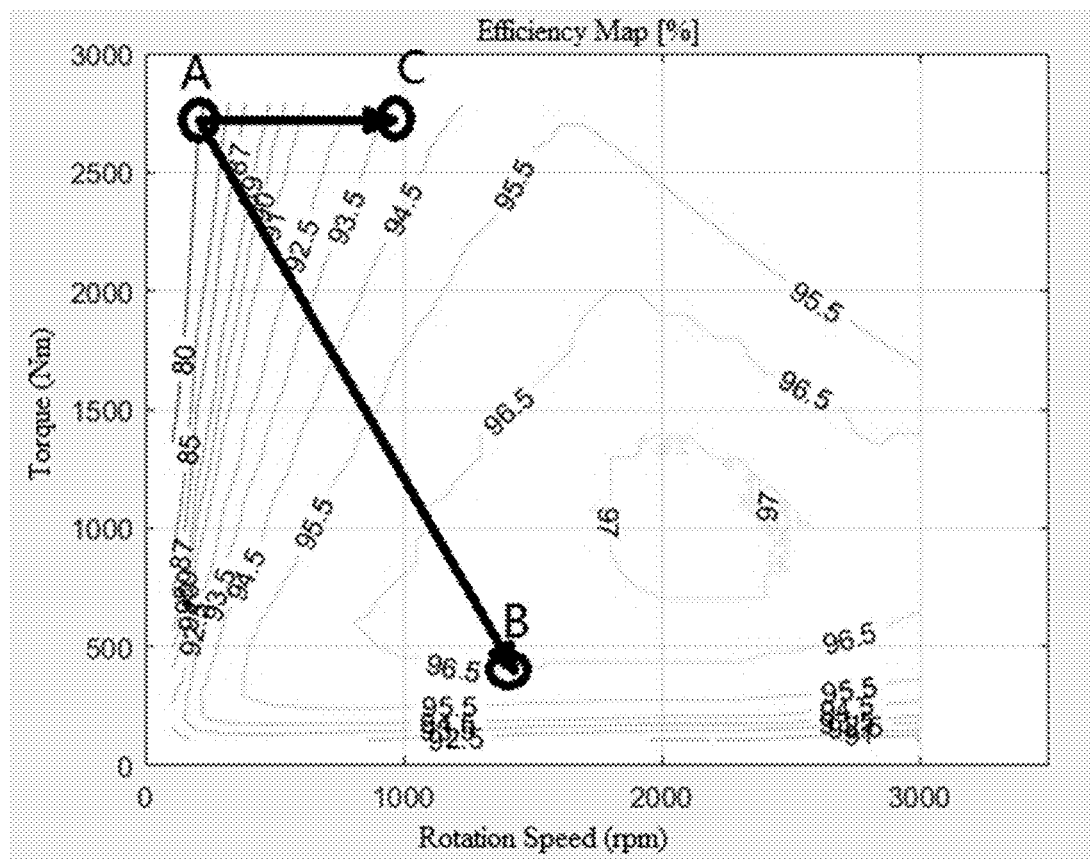
FIG. 9 is a schematic view of motor efficiency provided according to an embodiment of the present application.

A hybrid power system including a motor and an engine is first introduced hereinafter. As shown in FIG. 7 and FIG. 8, FIG. 8 is a schematic cross-sectional view of FIG. 7 along a line AA. The hybrid power system includes an engine 10 and a motor 20; the motor 20 includes a motor rotor 22, a motor stator 21 and a motor controller; where an output shaft of the engine 10 is connected to a center shaft 23 of the motor rotor 22, and two ends of the center shaft 23 of the motor rotor 22 are respectively connected to two motor bearings 31; the motor controller is connected to the motor stator 21; the motor stator 21 is connected to a driving shaft 40 of a motor vehicle through a transmission mechanism 32; the motor 20 is configured to determine an output torque according to a rotation speed of the motor 20, and transmit the output torque to the driving shaft 40; the rotation speed of the motor 20 is equal to a difference between a rotation speed of the motor rotor 22 and a rotation speed of the motor stator 21.

In an actual application process, the motor controller provides a driving signal for the motor stator 21, so that the motor stator 21 of the motor 20 stator may determine and generate a driving magnetic field according to the driving signal.

Under the coverage of the driving magnetic field, the motor rotor 22 may receive a driving force provided by the driving magnetic field. At the same time, the motor rotor 22 may further receive a torque transmitted by an output shaft of the engine 10, which is connected to the motor stator 22, so the motor stator 22 rotates under the control of the driving magnetic field and the torque transmitted by the output shaft of the engine 10. Due to the complicated operating conditions of the motor vehicles, in certain operating conditions, the motor rotor 22 only rotates under the control of the driving magnetic field; in certain operating conditions, the motor rotor 22 only rotates under the control of the engine 10; in certain working conditions, the motor stator 21 and the motor rotor 22 rotate under the joint control of the driving magnetic field and the engine 10.

The two ends of the center shaft 23 of the motor rotor 22 are respectively connected to the two motor bearings 31, and the two motor bearings 31 are configured to ensure the support and relative rotation of the motor stator 21 and the motor rotor 22.

Figure 6:
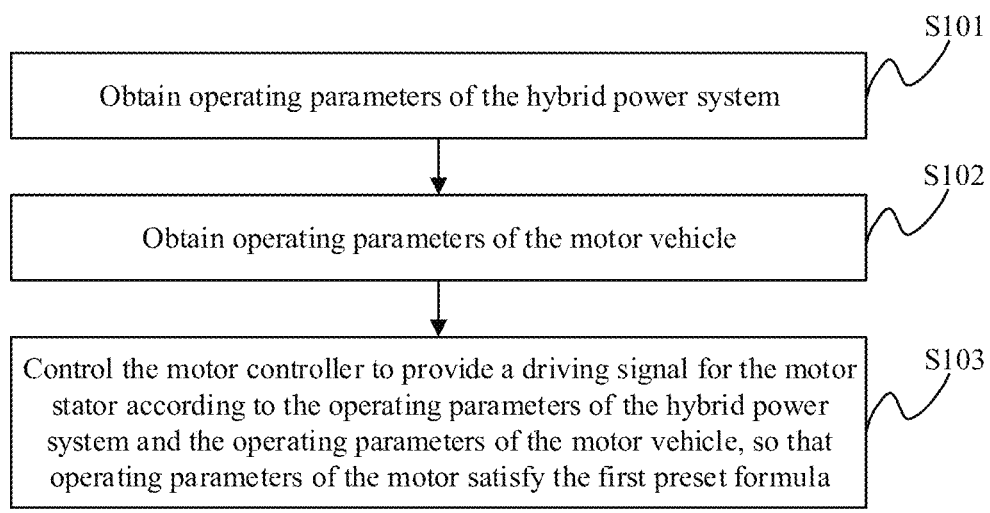
FIG. 6 is a schematic flowchart of a method for controlling a hybrid power system provided according to an embodiment of the present application.

In an embodiment, still referring to FIG. 6, the transmission mechanism 32 is a flange plate.

The flange plate includes a connecting extension, a connecting hole and a groove structure; an outer edge of the flange plate and the motor stator are detachably connected, and the connecting hole of the flange plate and the driving shaft are detachably connected.

For example, the detachable connection between the outer edge of the flange plate and the motor stator, and the detachable connection between the connecting hole of the flange plate and the driving shaft may both be realized by means of gears, specifically, an internal gear and an external gear are provided on the flange plate; the internal gear is provided in the connecting hole of the flange plate to cooperate with a gear structure on the driving shaft; the external gear is provided at an edge position of the flange plate to cooperate with a gear structure on the motor stator.

The motor stator and the outer edge of the flange plate are clamped or welded, and/or the connecting hole of the flange plate and the driving shaft are clamped or welded.

Further, a groove is further defined on the flange plate; the groove is located on a side of the flange plate facing the motor rotor 22, and is configured to accommodate one motor bearing 31; the connecting hole of the flange plate is defined on the bottom of the groove to connect to the driving shaft.

Further, in order to prevent the motor rotor from shaking during rotation, the two ends of the center shaft of the motor rotor are in an interference fit respectively with an inner ring of the motor bearing.

Further, in order to facilitate a user disassembling or assembling the flange plate, an area, facing away from the groove structure, of the flange plate is of a protruding structure, and a radial cross section of the protruding structure is non-circular, for example, which may be a rectangular structure or other structures that can be adapted to a wrench.

In an embodiment of the present application, since the motor stator 21 of the motor is connected to the driving shaft of the motor vehicle through the transmission mechanism 32, rather than connected to a fixed structure such as a chassis of the motor vehicle, the motor stator 21 may be rotatable relative to the chassis of the motor vehicle. Specifically, since the motor stator 21 is connected to the driving shaft 40, the motor stator 21 may receive a torque signal transmitted by the driving shaft 40 under certain working conditions. In addition, the motor stator 21 may further receive the driving signal and generate a driving magnetic field. The driving magnetic field may drive the motor rotor 22 to rotate, besides that, the rotation of the motor rotor 22 may generate a driving force on the motor stator 21 that generates the driving magnetic field. Therefore, the motor stator 21 is configured to rotate under the control of the torque signal transmitted by the driving shaft 40 and/or a rotation state of the motor rotor 22. That is, in certain working conditions, the motor stator 21 only rotates under the control of the torque signal transmitted by the driving shaft 40; in certain operating conditions, the motor stator 21 only rotates under the control of the rotation state of the motor rotor 22; in certain working conditions, the motor stator 21 rotates under the joint control of the torque signal transmitted by the driving shaft 40 and the rotation state of the motor rotor 22.

Generally, the driving signal received by the motor stator 21 includes a driving current signal and a driving voltage signal.

On the basis of the above embodiments, in an embodiment of the present application, still referring to FIG. 6, the hybrid power system further includes: a motor casing 24 encapsulating the motor stator 21 and the motor rotor 22 together, and the motor casing 24 is fixedly connected to the chassis of the motor vehicle.

The motor casing 24 is configured to provide protection for the motor stator 21 and the motor rotor 22, and to improve the integration of the motor 20 at the same time.

On the basis of the above embodiments, in another embodiment of the present application, in a case that the motor vehicle is a two-wheel drive motor vehicle, the driving shaft 40 is a rear axle or a front axle of the motor vehicle.

In a case that the driving shaft 40 is the rear axle of the motor vehicle, the motor vehicle is a rear drive vehicle.

In a case that the driving shaft 40 is the front axle of the motor vehicle, the motor vehicle is a front drive vehicle.

On the basis of the above embodiments, in another embodiment of the present application, in a case that the motor vehicle is a four-wheel drive motor vehicle, the driving shaft 40 is an input end of a differential lock of the motor vehicle.

In a four-wheel drive motor vehicle, a front axle and a rear axle are connected through a differential lock, and the hybrid power system is connected to the input end of the differential lock to provide driving force for the transmission system of the motor vehicle.

The hybrid power system includes the engine 10 and the motor 20. The motor stator 21 of the motor is connected to the driving shaft of the motor vehicle through the transmission mechanism 32, so that the motor stator 21 may be rotatable relative to the chassis of the motor vehicle, and the hybrid power system including the engine 10 and the motor 20 can meet the application of various working conditions such as starting, idling, forward travelling and reversing of the motor vehicle, which greatly reduces the number of parts and components of the hybrid power system, thereby simplifying the overall structure of the hybrid power system, and reducing failure point of the hybrid power system.

Control logic of the hybrid power system provided according to the embodiments of the present application will be briefly described below.

In all operating conditions of the motor vehicle, the hybrid power system satisfies the following conditions: rotation speed of driving shaft 40: $n_{Veh}=n_{Eng}-n_{TM}$; torque of driving shaft 40: $T_{Veh}+T_\alpha=T_{Eng}=T_{TM}$; where: $n_{Veh}$ is the rotation speed of the driving shaft 40 of the motor vehicle (which is proportional to the rotation speed of the motor vehicle); $n_{Eng}$ is the rotation speed of the engine 10 of the motor vehicle; $n_{TM}$ is the rotation speed of the motor 20 (the rotation speed of the motor rotor 22 relative to the motor stator 21) $T_{Veh}$ is the resistance torque of the motor vehicle, which is obtained by calculating a wind resistance and a friction resistance of the motor vehicle; $T_\alpha$ is the accelerating torque of the motor vehicle, that is, the remaining torque after the power system overcomes the resistance torque; $T_{Eng}$ is the net output torque of the engine 10; $T_{TM}$ is the output torque of the motor 20.

Specifically, in a case that the motor vehicle is parked: a) in a case that the engine 10 is stopped, the rotation speed of the motor 20 is 0 rpm; b) in a case that the engine 10 is idling, the rotation speed of the engine 10 is $n_{Eng0}$, the rotation speed of the motor 20 $n_{TM0}=n_{Eng0}$, the torque of the motor 20 is equal to the net output torque of the engine 10, that is $T_{Eng0}=T_{TM0}=0$ N·m; c) the engine 10 is parked to generate electricity; the rotation speed of the engine 10 is $n_{Eng1}$, the rotation speed of the motor 20 is $n_{TM1}=n_{Eng1}$; the torque of the motor 20 is equal to the net output torque of the engine 10, that is, $T_{Eng1}=T_{TM1}$, since the motor vehicle is parked, the vehicle speed $n_{Veh1}=0$. Due to the interaction force, a fixed torque of the motor stator 21 is provided by the driving shaft 40 at this time, that is, $T_{Veh1}=T_{TM1}\neq 0$, the torque required by the motor stator 21 is provided by the driving shaft 40 through the wheel braking system.

During an engine start and travelling process of the motor vehicle: a) the speed of the motor vehicle starts from 0, the rotation speed of the motor 20, that is, the rotation speed of the motor 20 starts from the rotation speed of the engine 10. The rotation speed of the engine 10 and the motor 20 may be adjusted during the engine start and travelling process, so that the engine 10 and the motor 20 in the system are within a desirable working range; as shown in FIG. 8, the working point of the motor 20 may be moved from A to B during the engine start process. When the vehicle is started, the efficiency of the motor 20 may be directly increased from lower than 80% to higher than 96%, which improves the system efficiency. At the same time, since the torque of the motor 20 is greatly reduced, heat generated by the motor 20 is also greatly reduced, which has a significant cooling effect on the motor 20. (The heat generated by the motor 20 is positively correlated with the torque of the motor 20); in FIG. 8, the horizontal axis represents the rotation speed of the motor 20, in rpm; the vertical axis represents the torque of the motor 20, in N·m. b) as for travelling electricity generation function, the motor 20 adopts redundant power of the engine 10 (that is, the power of the engine 10 excluding the power used for the traveling of the motor vehicle) for the travelling electricity generation.

During a braking process of the motor vehicle: the speed of the motor vehicle is reduced from $n_{Veh1}\neq 0$ according to a speed relationship $n_{Veh}=n_{Eng}-n_{TM}$, until $n_{Veh}=0$, that is, the rotation speed of the motor 20 is equal to the rotation speed of the engine 10. Since the rotation speed of the motor 20 and the vehicle speed are no longer in a fixed proportional relationship, during the braking process, the rotation speed of the motor 20 may be adjusted to provide greater braking power, that is, the working point of the motor 20 is moved from A to C in FIG. 7, and the braking power may be improved by several times. The working point of the motor 20 may also be moved from A to B, and in a premise of providing the same braking power, the efficiency of the motor 20 is significantly improved and heat generated by the motor 20 is reduced. Refer to formula (1) for the relationship between the power, the rotation speed and the torque during braking;

$$P=n_{TM}\times T_{TM}/9550 \qquad (1)$$

where P represents the power of the motor 20.

The system for controlling the hybrid power system provided in the embodiments of the present application will be described below. The system for controlling the hybrid power system described below and the method for controlling the hybrid power system described above may be cross-referenced.

Correspondingly, the system for controlling a hybrid power system is provided according to an embodiment of the present application, which is applied to a hybrid power system including an engine and a motor. A motor controller is connected to a motor stator; the motor stator is further connected to a driving shaft of a motor vehicle. The system for controlling the hybrid power system includes: a first parameter obtaining module configured to obtain operating parameters of the hybrid power system, in which the operating parameters of the hybrid power system includes the rotation speed of the engine, the rotation speed of the motor, the net output torque of the engine and the torque of the motor; the speed of the motor is equal to the difference between the rotation speed of the motor rotor and the rotation speed of the motor stator; a second parameter obtaining module configured to obtain operating parameters of the motor vehicle, in which the operating parameters of the motor vehicle includes the rotation speed of the driving shaft, the resistance torque of the motor vehicle, and the acceleration torque of the motor vehicle; a motor control module configured to control, according to the operating parameters of the hybrid power system and the operating parameters of the motor vehicle, the motor controller to provide a driving signal for the motor stator, so that operating parameters of the motor satisfy a first preset formula;

where the first preset formula is $$\begin{cases} n_{Veh}=n_{Eng}-n_{TM} \\ T_{Veh}+T_a=T_{Eng}=T_{TM} \end{cases};$$

$n_{Veh}$ is the rotation speed of the driving shaft; $n_{Eng}$ is the rotation speed of the engine; $n_{TM}$ is the rotation speed of the motor; $T_{Veh}$ is the resistance torque of the motor vehicle; $T_\alpha$ is the acceleration torque of the motor vehicle; $T_{Eng}$ is the net output torque of the engine; $T_{TM}$ is the torque of the motor.

In an embodiment, in a case that the motor vehicle is in a parking state; that, the motor control module is configured to control, according to the operating parameters of the hybrid power system and the operating parameters of the motor vehicle, the motor controller to provide a driving signal for the motor stator, so that operating parameters of the motor satisfy the first preset formula, is specifically configured to: in a case that the engine is stopped, control the rotation speed of the motor to be 0 rpm; in a case that the engine is idling, control the rotation speed of the motor to be equal to the rotation speed of the engine, and control the torque of the motor to be equal to the net output torque of the engine; in a case that the engine is in a parking and electricity generation state, control the rotation speed of the motor to be equal to the rotation speed of the engine, and control the torque of the motor to be equal to the net output torque of the engine; where the torque of the motor stator of the motor is provided by the braking system of the motor vehicle.

In an embodiment, in a case that the motor vehicle is in the engine start process or the travelling process; that, the motor control module is configured to control, according to the operating parameters of the hybrid power system and the operating parameters of the motor vehicle, the motor controller to provide a driving signal for the motor stator, so that operating parameters of the motor satisfy the first preset formula, is specifically configured to: in a case that the motor vehicle is in the engine start or the travelling process, control the rotation speed of the motor to be equal to the difference between the rotation speed of the engine and the rotation speed of the driving shaft; in a case that the motor vehicle is in the travelling and electricity generation process, control the motor to use the redundant power of the engine for electricity generation in travelling; where the redundant power of the engine is equal to the difference between the total output power of the engine and the driving power of the engine; since the torque of the engine, the torque of the motor and the torque of the driving shaft are the same, that is, electricity generation power during travelling is the difference between the output power of the engine and the output power of the driving shaft, which is $$P_{power\ generation} =$$
$$P_{Eng} - P_{Veh} = \frac{n_{Eng} \times T_{Eng}}{9550} - \frac{n_{Veh} \times T_{Veh}}{9550} \frac{(n_{Eng} - n_{Veh}) \times T_{Eng}}{9550} = \frac{n_{MT} \times T_{MT}}{9550}$$

In an embodiment, that, the motor control module is configured to control the rotation speed of the motor to be equal to the difference between the rotation speed of the engine and the rotation speed of the driving shaft, is specifically configured to: in a premise that the rotation speed of the motor is controlled to be equal to the difference between the rotation speed of the engine and the rotation speed of the driving shaft, adjust the rotation speed of the motor and the rotation speed of the engine, so that the motor runs in a preset working range, and efficiency of the preset working range is higher than or equal to a preset value.

In an embodiment, in a case that the motor vehicle is in a braking process; that, the motor control module is configured to control, according to the operating parameters of the hybrid power system and the operating parameters of the motor vehicle, the motor controller to provide a driving signal for the motor stator, so that operating parameters of the motor satisfy the first preset formula, is specifically configured to: control the difference between the rotation speed of the engine and the rotation speed of the motor to be equal to the speed of the driving shaft.

In summary, the method and the system for controlling the hybrid power system are provided according to the embodiments of the present application, where the method for controlling the hybrid power system is applied to a hybrid power system including an engine and a motor. A motor stator of the motor is connected to a driving shaft of a motor vehicle through a transmission mechanism to meet the operation requirements of the hybrid power system under various working conditions, which greatly reduces the number of parts and components of the hybrid power system, and reduces the structural complexity of the hybrid power system. In addition, the method for controlling the hybrid power system controls the motor controller to provide the driving signal for the motor stator according to the operating parameters of the hybrid power system and the operating parameters of the motor vehicle, so that operating parameters of the motor satisfy the first preset formula, thereby avoiding the possibility of the motor running at zero speed or in a low speed range under various working conditions, avoiding the occurrence of poor performance such as low efficiency and poor torque response of the motor in these operating conditions, and improving the user experience.

The above embodiments are described in a progressive manner. Each of the embodiments is mainly focused on describing its differences from other embodiments, and reference may be made among these embodiments with respect to the same or similar parts.

The above illustration of the disclosed embodiments can enable those skilled in the art to implement or use the present application. Various modifications to the embodiments are apparent to the person skilled in the art, and the general principle herein can be implemented in other embodiments without departing from the spirit or scope of the present application. Therefore, the present application is not limited to the embodiments described herein, but should be in accordance with the broadest scope consistent with the principle and novel features disclosed herein.

The invention claimed is:

1. A method for controlling a hybrid power system, wherein the method is applied to the hybrid power system comprising an engine and a motor; the motor comprises a motor rotor, a motor stator, and a motor controller; an output shaft of the engine is connected to a center shaft of the motor rotor, two ends of the center shaft of the motor rotor are respectively connected to two motor bearings, and the motor rotor is supported by the two motor bearings; the motor controller is connected to the motor stator for providing a driving current for the motor stator; the motor stator is connected to a driving shaft of a motor vehicle through a transmission mechanism, so that the motor stator is driven to rotate when the driving shaft rotates; the motor is configured to determine an output torque according to a rotation speed of the motor, and transmit the output torque to the driving shaft;

the rotation speed of the motor is equal to a difference between a rotation speed of the motor rotor and a rotation speed of the motor stator; wherein the method for controlling the hybrid power system comprises:

obtaining operating parameters of the hybrid power system, wherein the operating parameters of the hybrid power system comprises a rotation speed of the engine, the rotation speed of the motor, a net output torque of the engine and a torque of the motor, the rotation speed of the motor is equal to a difference between the rotation speed of the motor rotor and the rotation speed of the motor stator;

obtaining operating parameters of the motor vehicle, wherein the operating parameters of the motor vehicle comprises a rotation speed of the driving shaft, a resistance torque of the motor vehicle, and an acceleration torque of the motor vehicle;

controlling, according to the operating parameters of the hybrid power system and the operating parameters of the motor vehicle, the motor controller to provide a driving signal for the motor stator, so that operating parameters of the motor satisfy a first preset formula;

wherein the first preset formula is $$\begin{cases} n_{Veh} = n_{Eng} - n_{TM} \\ T_{Veh} + T_a = T_{Eng} = T_{TM} \end{cases},$$

wherein $n_{Veh}$ is the rotation speed of the driving shaft;
$n_{Eng}$ is the rotation speed of the engine;
$n_{TM}$ is the rotation speed of the motor;
$T_{Veh}$ is the resistance torque of the motor vehicle;
$T_a$ is the acceleration torque of the motor vehicle;
$T_{Eng}$ is the net output torque of the engine; and
$T_{TM}$ is the torque of the motor.

2. The method according to claim 1, wherein in a case that the motor vehicle is in a parking state controlling, according to the operating parameters of the hybrid power system and the operating parameters of the motor vehicle, the motor controller to provide the driving signal for the motor stator, so that operating parameters of the motor satisfy the first preset formula, comprises:
   in a case that the engine is stopped, controlling the rotation speed of the motor to be 0 rpm;
   in a case that the engine is idling, controlling the rotation speed of the motor to be equal to the rotation speed of the engine, and controlling the torque of the motor to be equal to the net output torque of the engine;
   in a case that the engine is in a parking and electricity generation state, controlling the rotation speed of the motor to be equal to the rotation speed of the engine, and controlling the torque of the motor to be equal to the net output torque of the engine; wherein a torque of the motor stator of the motor is provided by a braking system of the motor vehicle.

3. The method according to claim 1, wherein in a case that the motor vehicle is in an engine start process or a travelling process controlling, according to the operating parameters of the hybrid power system and the operating parameters of the motor vehicle, the motor controller to provide the driving signal for the motor stator, so that operating parameters of the motor satisfy the first preset formula, comprises:
   in a case that the motor vehicle is in the engine start or the travelling process, controlling the rotation speed of the motor to be equal to a difference between the rotation speed of the engine and the rotation speed of the driving shaft;
   in a case that the motor vehicle is in a travelling and electricity generation process, controlling the motor to use redundant power of the engine for electricity generation in travelling;
   wherein the redundant power of the engine is equal to a difference between a total output power of the engine and a driving power of the engine.

4. The method according to claim 3, wherein controlling an electricity speed of the motor to be equal to a difference between an electricity speed of the engine and an electricity speed of the driving shaft, comprises:
   in a premise that the electricity speed of the motor is controlled to be equal to the difference between the electricity speed of the engine and the electricity speed of the driving shaft, adjusting the electricity speed of the motor and the electricity speed of the engine, so that the motor runs in a preset working range, wherein efficiency of the preset working range is greater than or equal to a preset value.

5. The method according to claim 1, wherein in a case that the motor vehicle is in a braking process controlling, according to the operating parameters of the hybrid power system and the operating parameters of the motor vehicle, the motor controller to provide the driving signal for the motor stator, so that operating parameters of the motor satisfy the first preset formula, comprises:
   controlling a difference between an electricity speed of the engine and an electricity speed of the motor to be equal to electricity speed of the driving shaft.

6. A system for controlling a hybrid power system, wherein the system is applied to the hybrid power system comprising an engine and a motor; the motor comprises a motor rotor, a motor stator, and a motor controller; an output shaft of the engine is connected to a center shaft of the motor rotor, two ends of the center shaft of the motor rotor are respectively connected to two motor bearings, and the motor rotor is supported by the two motor bearings; the motor controller is connected to the motor stator to provide a driving current for the motor stator; the motor stator is connected to a driving shaft of a motor vehicle through a transmission mechanism, so that the motor stator is driven to rotate when the driving shaft rotates; the motor is configured to determine an output torque according to a rotation speed of the motor, and transmit the output torque to the driving shaft; the rotation speed of the motor is equal to a difference between a rotation speed of the motor rotor and a rotation speed of the motor stator; wherein the system for controlling the hybrid power system comprises:
   a first parameter obtaining module configured to obtain operating parameters of the hybrid power system, wherein the operating parameters of the hybrid power system comprises a rotation speed of the engine, the rotation speed of the motor, a net output torque of the engine and a torque of the motor, the rotation speed of the motor is equal to a difference between the rotation speed of the motor rotor and the rotation speed of the motor stator;
   a second parameter obtaining module configured to obtain operating parameters of the motor vehicle, wherein the operating parameters of the motor vehicle comprises a rotation speed of the driving shaft, a resistance torque of the motor vehicle, and an acceleration torque of the motor vehicle;
   a motor control module configured to control, according to the operating parameters of the hybrid power system and the operating parameters of the motor vehicle, the motor controller to provide a driving signal for the motor stator, so that operating parameters of the motor satisfy a first preset formula;
   wherein the first preset formula is $$\begin{cases} n_{Veh} = n_{Eng} - n_{TM} \\ T_{Veh} + T_a = T_{Eng} = T_{TM} \end{cases},$$

wherein $n_{Veh}$ is the rotation speed of the driving shaft;
$n_{Eng}$ is the rotation speed of the engine;
$n_{TM}$ is the rotation speed of the motor;
$T_{Veh}$ is the resistance torque of the motor vehicle;
$T_a$ is the acceleration torque of the motor vehicle;
$T_{Eng}$ is the net output torque of the engine;
$T_{TM}$ is the torque of the motor.

7. The system according to claim 6, wherein in a case that the motor vehicle is in a parked state the motor control module is configured to control, according to the operating parameters of the hybrid power system and the operating parameters of the motor vehicle, the motor controller to provide the driving signal for the motor stator, so that operating parameters of the motor satisfy the first preset formula, is specifically configured to:
- in a case that the engine is stopped, control the rotation speed of the motor to be 0 rpm;
- in a case that the engine is idling, control the rotation speed of the motor to be equal to the speed of the engine, and control the torque of the motor to be equal to the net output torque of the engine;
- in a case that the engine is in a parking and in an electricity generation state, control the rotation speed of the motor to be equal to the rotation speed of the engine, and control the torque of the motor to be equal to the net output torque of the engine;
- wherein a torque of the motor stator of the motor is provided by a braking system of the motor vehicle.

8. The system according to claim 6, wherein in a case that the motor vehicle is in an engine start process or a travelling process the motor control module is configured to control, according to the operating parameters of the hybrid power system and the operating parameters of the motor vehicle, the motor controller to provide the driving signal for the motor stator, so that operating parameters of the motor satisfy the first preset formula, is specifically configured to:
- in a case that the motor vehicle is in the engine start or the travelling process, control the rotation speed of the motor to be equal to a difference between the rotation speed of the engine and the rotation speed of the driving shaft;
- in a case that the motor vehicle is in a travelling and electricity generation process, control the motor to use redundant power of the engine for electricity generation in travelling;
- wherein the redundant power of the engine is equal to a difference between a total output power of the engine and a driving power of the engine.

9. The system according to claim 8, wherein the motor control module is configured to control the rotation speed of the motor to be equal to the difference between the rotation speed of the engine and the rotation speed of the driving shaft, the motor control module, is specifically configured to:
- in a premise that the rotation speed of the motor is controlled to be equal to the difference between the rotation speed of the engine and the rotation speed of the driving shaft, adjust the rotation speed of the motor and the rotation speed of the engine, so that the motor runs in a preset working range, wherein efficiency of the preset working range is greater than or equal to a preset value.

10. The system according to claim 6, wherein in a case that the motor vehicle is in a braking process the motor control module is configured to control, according to the operating parameters of the hybrid power system and the operating parameters of the motor vehicle, the motor controller to provide a driving signal for the motor stator, so that operating parameters of the motor satisfy the first preset formula, is specifically configured to:
- control a difference between the rotation speed of the engine and the rotation speed of the motor to be equal to the rotation speed of the driving shaft.

\* \* \* \* \*